United States Patent [19]

Maru

[11] 4,352,863
[45] Oct. 5, 1982

[54] APPARATUS AND METHOD FOR PRODUCING HIGH PRESSURE STEAM IN A FUEL CELL SYSTEM

[75] Inventor: Hansraj C. Maru, Brookfield Center, Conn.

[73] Assignee: Energy Research Corporation, Danbury, Conn.

[21] Appl. No.: 226,901

[22] Filed: Jan. 21, 1981

[51] Int. Cl.³ .............................................. H01M 8/06
[52] U.S. Cl. ........................................ 429/17; 429/20
[58] Field of Search .............................. 429/20, 17, 19

[56] References Cited

U.S. PATENT DOCUMENTS

| | | | |
|---|---|---|---|
| 3,976,507 | 8/1976 | Bloomfield | 429/17 |
| 3,982,962 | 9/1976 | Bloomfield | 429/20 |
| 4,001,041 | 1/1977 | Menard | 429/20 |
| 4,046,956 | 9/1977 | Fanciullo | 429/20 |
| 4,128,700 | 12/1978 | Sederquist | 429/20 |

*Primary Examiner*—Donald L. Walton

[57] ABSTRACT

High pressure steam is generated in a fuel cell system utilizing a quantity of process gas which has been exhausted from the system fuel cell and whose temperature has been raised through heat exchange with a higher temperature gas generated elsewhere in the fuel cell system.

26 Claims, 1 Drawing Figure

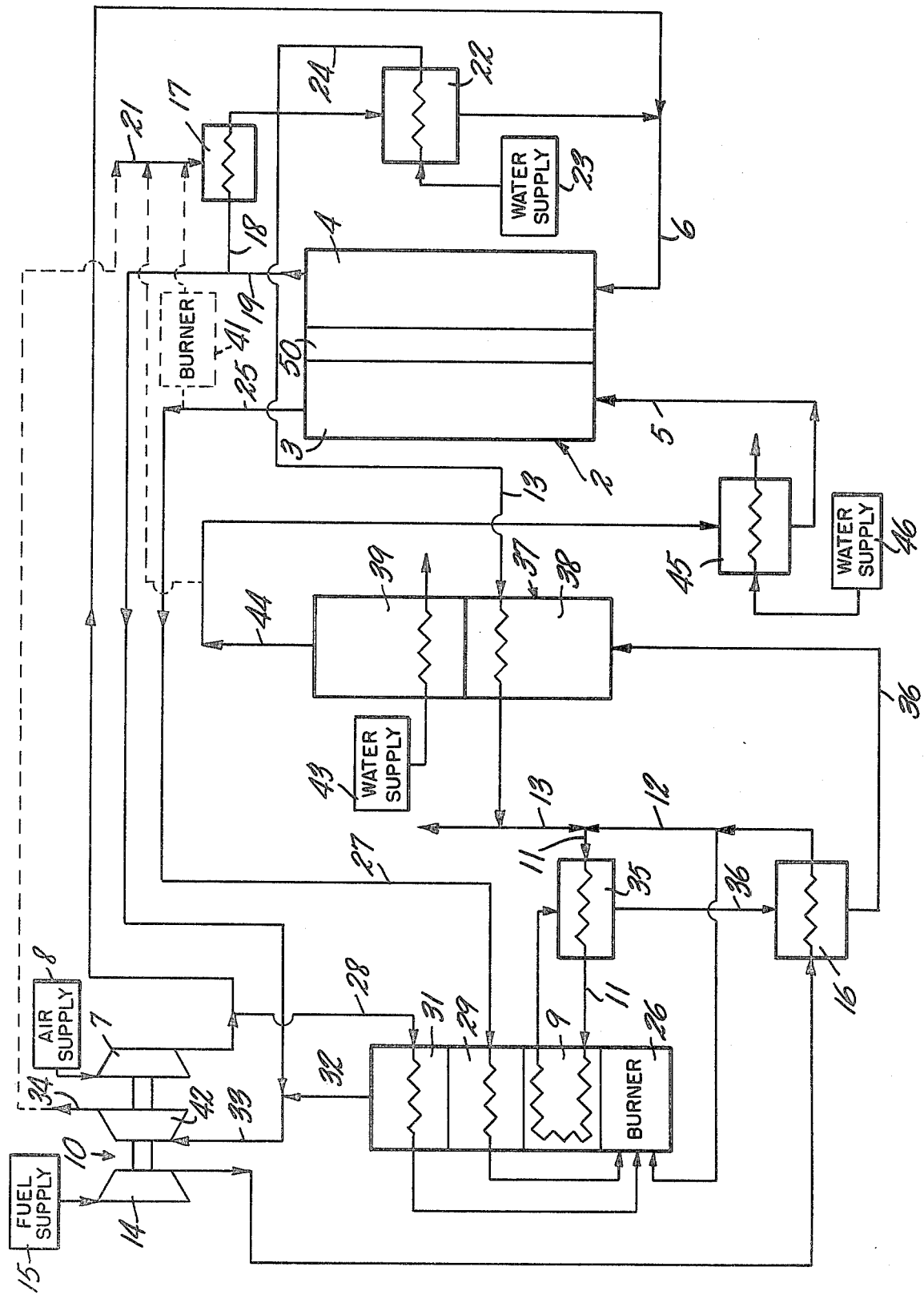

APPARATUS AND METHOD FOR PRODUCING HIGH PRESSURE STEAM IN A FUEL CELL SYSTEM

BACKGROUND OF THE INVENTION

This invention pertains to fuel cell systems and, in particular, to fuel cell systems which utilize steam.

Fuel cell systems often utilize high pressure steam for reforming reaction (fuel processing) and for use as process steam for waste heat utilization. In reforming reaction, the steam is combined with a hydrocarbon fuel and the combination applied to a reformer which provides at its output fuel process gas to be used in the fuel cell or fuel cell stack of the system.

U.S. Pat. No. 3,969,145 discloses one steam generating practice wherein use is made of the heated oxidant and fuel process gases passing through the system fuel cell. Metallic tubes carrying coolant water are situated internal to the cell stack and in heat exchanging relationship with the respective flows of fuel and oxidant gases. The water in the tubes is thereby heated to produce steam which is also simultaneously heated in the same manner. The steam is then removed from the tubes and used elsewhere in the system as, for example, in steam reforming reaction of the type described above.

It has also been proposed to use the exhausted oxidant gas of the fuel cell system itself for steam generation external to the cell. In this case, the exhausted oxidant gas and water are supplied to a heat exchanger with the resultant production of steam.

In both the above practices, increased fuel cell temperature is required to provide a desired amount of steam at increased pressures. This can be seen from the equation governing the ratio of generated steam to generating fuel cell gas which is as follows:

$$Q = \frac{\text{lb/hr steam}}{\text{lb/hr gas}} = \frac{C_p (t_o - t_p)}{\Delta H}$$

where
- $\Delta H$ is the latent heat of steam
- $C_p$ is the heat capacity of gas
- $t_o$ is the initial temperature of the gas
- $t_p$ is a temperature equal to the steam saturation temperature $t_s$ which increases with desired steam pressure plus a small differential $t_d$ referred to as the pinch point.

Assuming that the gas stream is at a temperature of 375° F. and that steam at 105 psia is required (this corresponds to $t_s = 332°$ F. and $\Delta H = 885$ Btu/lb) and further that a differential $t_d = 20°$ F. is used and $C_p = 0.28$ Btu/lb °F., then the ratio Q is calculated as follows:

$$Q = \frac{0.28 (375 - 352)}{885}$$

$$Q = 0.007$$

For steam at a pressure above 105 psia, the value of $t_p$ is increased while the values of $\Delta H$ and $C_p$ remain substantially the same. As a result, to obtain at the higher pressure the same quantity of steam as obtained at the 105 psia level, the value of the fuel gas temperature $t_o$ must be increased by the amount of the increase in the value $t_p$. This of course requires an increase in fuel cell operating temperature.

At steam pressures of the order of 100 to 180 psi, which pressures are desirable for many fuel cell systems or for many industrial process steam applications, the required increase in fuel cell temperature over conventional temperatures is such as to measurably decrease fuel cell life. As a result, use of the aforesaid practices to provide steam at these high pressures is undesirable.

One possible alternative to providing the increased pressure steam without raising fuel cell temperature, would be to use a compressor. However, this alternative is undesirable because of cost and power requirement considerations.

It is therefore an object of the present invention to provide a fuel cell system having an improved capability for generating steam.

It is a further object of the present invention to provide a fuel cell system capable of providing a given amount of steam at increasing pressures and useable for process gas reforming without having to increase fuel cell temperature.

SUMMARY OF THE INVENTION

In accordance with the principles of the present invention, the above and other objectives are realized in a fuel cell system wherein process gas exhausted from the fuel cell of the system is heated to a temperature sufficient to produce a predetermined amount of steam at a predetermined pressure by gas at a higher temperature generated elsewhere in the system. The heating of the exhausted process gas occurs in a heat exchanger external to the cell and the resultant gas is then utilized to produce the desired steam.

In the preferred form of the invention, the fuel cell is operated with excess process gas for cooling the cell to a desired operating temperature and the exhausted cooling process gas is used for steam generation. In still further preferred form, excess oxidant gas is utilized for fuel cell cooling and exhausted oxidant gas for steam generation.

BRIEF DESCRIPTION OF THE DRAWINGS

The above and other features and aspects of the present invention will become more apparent upon reading the following detailed description in conjunction with the accompanying sole drawing which shows a fuel cell system in accordance with the principles of the present invention.

DETAILED DESCRIPTION

In FIG. 1, the fuel cell system 1 comprises a fuel cell 2 which, preferably, is a phosphoric acid cell, although the principles of the invention extend to other cell types such as, for example, molten carbonate cells and solid oxide cells. An anode section 3 and a cathode section 4 communicating with an electrolyte section 50 receive respective fuel process gas and oxidant process gas along input lines 5 and 6, respectively. In conventional practice, the fuel and oxidant gases are at substantially the same pressure which might, typically, be in the range of 30 to 150 psia, so as to promote fuel cell efficiency. Also, in the present illustrative example, the flow of oxidant process gas is further of an amount in excess of that required for electrochemical reaction, the excess gas being of a quantity sufficient to cool the fuel cell to a predetermined temperature promotive of desired fuel cell life.

The oxidant process gas is derived from a compressor section 7 of a turbocompressor unit 10, the compressor 7 raising the pressure of the oxidant gas from a supply 8 to the desired pressure. The fuel process gas is derived from a reformer 9 which receives from a common line 11 a mixture of preheated hydrocarbon fuel and steam coupled to the line 11 by respective lines 12 and 13. The hydrocarbon fuel is provided to the line 12 from a compressor section 14 of the turbocompressor 10, the section being fed from a fuel supply 15. A pre-heater in the form of a heat exchanger 16 situated in the line 12 preheats the fresh fuel prior to coupling to the common line 11.

In order for the fuel process gas produced by the reformer 9 to be at the desired pressure, the steam provided to the line 11 from the line 13 must be at least at that pressure, since the steam pressure controls the resultant fuel process gas pressure. Perferably, the steam pressure should be higher than the required fuel process gas pressure, in order to account for pressure losses in the reformer and in the lines carrying the gas to the anode section 3. Additionally, to prevent carbon formation in the reformer, a certain ratio of steam to fuel is required. For example, with liquid naptha as a fuel, a ratio of 4 moles steam to 1 mole carbon is desirable. Preferably, that amount of steam should be at a pressure above the fuel gas pressure.

In accordance with the principles of the present invention, steam at the desired pressure and of a desired amount is generated in the fuel cell system utilizing a quantity of excess oxidant gas exhausted from the cathode section 4 and, therefore, at the predetermined fuel cell temperature, and a further quantity of higher temperature gas derived from elsewhere in the fuel cell system. These gases are carried via lines 18 and 21 to an auxiliary heater or heat exchanger 17, the temperature of the higher temperature gas being sufficient to raise the temperature of the quantity of oxidant gas to that required to produce the desired amount of steam at the desired pressure. The increased temperature oxidant gas is, thereafter, applied to a steam generator in the form of a heat exchanger 22 having a pressure valve for allowing steam issuance at the desired pressure. Water from a supply 23 is coupled to the generator 22 and is raised therein to steam at such pressure, the steam then being coupled to the generator output line 24 which feeds steam line 13.

As above-indicated, the higher temperature gas in the line 21 is obtained from gas derived in the fuel cell system from elsewhere than the fuel cell 2. As shown in dotted line, such gas may be obtained by passage of a portion of the unburned anode gas exhausted into anode exhaust line 25 through a burner 41, thereby producing gas at a significantly higher temperature than the cell operating temperature. Other gases which also can be used as the higher temperature gas will be pointed out below in the discussion of the remainder of the system 1.

The reformer 9 is provided with reaction heat from a burner 26 which burns a combination of preheated fresh supply fuel, exhausted fuel gas and compressed oxidant supply gas. The latter gases are coupled to the burner 26 via lines 27 and 28, respectively in which are situated heat exchangers 29 and 31 for raising the temperatures of the respective gases. The latter exchangers are in stacked relationship with the reformer 9 and the burner 26 and are heated by the burner gas. The burner gas is thereafter coupled via line 32 to an exit line 33 which also receives a quantity of exhausted oxidant process gas from the line 19. The gas in the line 33 is expanded in a turboexpander section 42 of the turbocompressor 10 and is exhausted from the system via line 34. As indicated in dotted line, the gas in line 34 also can be coupled to line 21 for providing gas for heating the exhausted oxidant gas coupled to the heat exchanger 17.

The combined fuel and steam in the line 11 is preheated prior to application to reformer 9 via a heat exchanger 35 to which is also applied the outgoing fuel process gas generated by the reformer. The latter gas is thereafter cooled by passage via line 36 through heat exchanger 16 and a high temperature low temperature shift converter 37, the high temperature converter of which includes a heat exchanger section 38 for heat exchange with the steam in the line 13 prior to coupling to the line 11 and the low temperature converter of which includes a heat exchanger section 39 to which is coupled water from a further water supply 43.

The fuel process gas is brought to an intermediate temperature by the converter 37 and, as shown, in dotted line, the gas at the output line 44 of the converter is also suitable for coupling to the line 21 for application to the heat exchanger 17 for heating the exhausted oxidant gas coupled thereto. A further heat exchanger 45 in the line 44 receives the intermediate temperature fuel process gas and water from a supply 45 further lowering the temperature of same to the predetermined cell temperature for application to the line 5 feeding anode section 3.

As can be appreciated, the degree to which the temperature of the exhausted oxidant gas applied to the heat exchanger 17 is to be raised and, thus, the temperature of the higher temperature gas, as well as the amount of exhausted oxidant gas supplied will depend upon the desired pressure and amount of steam to be produced. The latter, in turn, will depend upon system requirements including, amongst other things, the desired fuel cell pressure and operating temperature, as well as the quantity and pressure of steam required in the reformer 9. The particular values of these parameters will of course depend upon each individual application.

In a typical situation of a phosphoric acid fuel cell stack at an operating temperature of 375° F. and fuel and oxidant gases at pressures of approximately 50 psia, and a reformer requiring a steam flow of 1.8 lb/hr.kw, the quantity of exhaust oxidant gas delivered to heat exchanger 17 might be 205 lb/hr.kw. In such case, the temperature of the further gas delivered to heat exchanger might be 500° to 1500° F., thereby raising the oxidant gas to a temperature of approximately 400° F. Production of this further gas at such temperature might, in turn, be realized by burning exhausted fuel gas. Alternatively, a similar flow of fuel gas at such temperature from the converter 37 or from the line 34 might also be used.

In all cases, it is understood that the above-described arrangements are merely illustrative of the many possible specific embodiments which represent applications of the present invention. Numerous and varied other arrangements can readily be devised in accordance with the principles of the present invention without departing from the spirit and scope of the invention. Thus, for example, the steam generator 22 and the auxiliary heater 17 could be combined into a single heat exchanger unit, instead of two separate units as specifically illustrated in the figure.

What is claimed is:

1. A fuel cell system comprising:

a fuel cell including a cathode section for receiving oxidant process gas and an anode section for receiving fuel process gas;

and means responsive to exhausted process gas and to gas at a higher temperature for producing steam, said steam producing means including:

heat exchanger means for receiving said exhausted process gas and said higher temperature gas in heat exchange relationship to increase the temperature of said exhausted process gas to a point where said exhausted process gas can be placed in heat exchange relationship with water to produce steam.

2. A fuel cell system in accordance with claim 1 wherein:

said higher temperature gas is derived from gas of said system.

3. A fuel cell system in accordance with claim 2 wherein:

the quantity of exhausted process gas received by said heat exchanger and the increased temperature of said received exhausted process gas are such as to enable production of said steam at a predetermined pressure.

4. A fuel cell system in accordance with claim 3 wherein:

said fuel cell receives one of said oxidant and fuel process gases in excess of that required for electrochemical reaction for cooling of said cell;

and the exhausted of said one of said oxidant and fuel process gases is the exhausted gas to which said steam producing means is responsive.

5. A fuel cell system in accordance with claim 3 wherein:

said exhausted process gas is exhausted oxidant process gas.

6. A fuel cell system in accordance with claim 5 further including:

means for burning exhausted fuel process gas to produce said higher temperature gas.

7. A fuel cell system in accordance with claim 5 wherein:

said fuel process gas is at a preselected pressure.

8. A fuel cell system in accordance with claim 7 further including:

means for combining fresh supply fuel with said steam;

and reforming means responsive to said combined fresh supply fuel and steam for providing said fuel process gas through a reforming reaction.

9. A fuel cell system in accordance with claim 8 wherein:

said predetermined pressure of said steam is such that said fuel process gas from said gas reforming means is at least at said preselected pressure.

10. A fuel cell system in accordance with claim 9 wherein:

the quantity of exhausted process gas received by said heat exchanger and the increased temperature of said received exhausted process gas are such as to enable production of a predetermined quantity of steam at said predetermined pressure, said predetermined quantity being sufficient for said reforming reaction.

11. A fuel cell system in accordance with claim 9 wherein:

said steam producing means further includes a steam generator for receiving water and said increased temperature process gas in heat exchanger relationship to thereby generate said steam.

12. A fuel cell system in accordance with claim 8 wherein:

said fuel process gas from said reforming means is at a first temperature higher than a preselected operating temperature for said cell;

and said system further includes means for reducing the temperature of said fuel process gas to a second temperature between said first temperature and said preselected operating temperature; and a quantity of said second temperature fuel process gas forms said higher temperature gas.

13. A fuel cell system in accordance with claim 8 further including:

means for burning a quantity of said fresh supply fuel to produce heating gas and for coupling said heating gas to said reformer for providing heat for said reforming reaction;

means for combining a portion of said heating gas with a portion of exhausted oxidant process gas; and means for reducing the pressure of said combination of said heating gas and said portion of exhausted oxidant process gas, a quantity of said reduced pressure combination of gases forming said higher temperature gas.

14. A fuel cell system in accordance with claim 7 wherein:

said preselected pressure is within the range of 30 to 200 psia.

15. A fuel cell in accordance with claim 1 or 2 wherein said fuel cell system further includes:

a phosphoric acid electrolyte disposed between said anode and cathode sections.

16. A method of producing steam in a fuel cell system including a fuel cell having anode and cathode sections receiving fuel and oxidant process gases, the method comprising:

obtaining a quanity of exhausted process gas;

utilizing said quantity of exhausted process gas and a quantity of higher temperature gas to produce steam including:

placing said quantities of exhausted process gas and higher temperature gas in heat exchange relationship to increase the temperature of said exhausted process gas to a point where said exhausted process gas can be placed in heat exchange relationship with water to produce steam.

17. A method in accordance with claim 16 wherein:

said higher temperature gas is derived from a gas of said system.

18. A method in accordance with claim 17 wherein:

the amount and temperature of said quantity of increased temperature exhausted process gas results in steam at a predetermined pressure.

19. A method in accordance with claim 18 wherein:

said fuel cell receives one of said oxidant and fuel process gases in excess of that required for electrochemical reaction for cooling of said cell;

and said step of obtaining is carried out by deriving a quantity of exhausted of said one of said oxidant and fuel process gases.

20. A method in accordance with claim 18 wherein:

said exhausted process gas is exhausted oxidant process gas.

21. A method in accordance with claim 20 wherein:

said method further includes burning exhuasted fuel process gas;

and said step of utilizing is carried by employing a quantity of said burned exhausted fuel process gas as said higher temperature gas.

22. A method in accordance with claim 20 further comprising:

combining a quantity of said steam with fresh supply fuel;

and subjecting said combination of steam and fresh supply fuel to a reforming reaction to provide said fuel process gas.

23. A method in accordance with claim 22 wherein:

said method further includes reducing the temperature of said fuel process gas produced by said reforming reaction;

and said step of utilizing is carried out employing a quantity of said reduced temperature fuel process gas as said higher temperature gas.

24. A method in accordance with claim 20 wherein: said method further includes:

burning a quantity of fresh supply fuel to produce heated gas for use in said reforming reaction;

combining a quantity of such heated gas with a portion of exhausted oxidant gas;

and reducing the pressure of said combination of gases, a quantity of said reduced pressure combination of gases forming said higher temperature gas.

25. A method in accordance with claims 16 or 17 wherein:

a phosphoric acid electrolyte is disposed between the anode and cathode sections of said fuel cell.

26. A method in accordance with claim 16 wherein:

said step of utilizing includes placing said increased temperature process gas in heat exchange relationship with water to produce steam.

* * * * *